United States Patent
Gasparini

(10) Patent No.: US 10,000,882 B2
(45) Date of Patent: Jun. 19, 2018

(54) METHOD FOR OPERATING A WASHING MACHINE

(71) Applicant: Electrolux Appliances Aktiebolag, Stockholm (SE)

(72) Inventor: Mirko Gasparini, Spilimbergo (IT)

(73) Assignee: Electrolux Appliances Aktiebolag (SE)

( * ) Notice: Subject to any disclaimer, the term of this patent is extended or adjusted under 35 U.S.C. 154(b) by 50 days.

(21) Appl. No.: 14/916,717

(22) PCT Filed: Sep. 5, 2014

(86) PCT No.: PCT/EP2014/068995
§ 371 (c)(1),
(2) Date: Mar. 4, 2016

(87) PCT Pub. No.: WO2015/036337
PCT Pub. Date: Mar. 19, 2015

(65) Prior Publication Data
US 2016/0215436 A1    Jul. 28, 2016

(30) Foreign Application Priority Data
Sep. 11, 2013    (EP) ..................................... 13183934

(51) Int. Cl.
*D06F 39/06*    (2006.01)
*D06F 35/00*    (2006.01)
(Continued)

(52) U.S. Cl.
CPC .............. *D06F 39/06* (2013.01); *D06F 33/02* (2013.01); *D06F 35/006* (2013.01);
(Continued)

(58) Field of Classification Search
CPC ........ D06F 39/06; D06F 39/087; D06F 33/02; D06F 35/00
See application file for complete search history.

(56) References Cited

U.S. PATENT DOCUMENTS 5,361,439 A * 11/1994 Malchow .............. D06F 35/007
68/12.12
5,890,247 A    4/1999 Erickson et al.
(Continued)

FOREIGN PATENT DOCUMENTS

DE    102010038969 A1    2/2011
EP    0268155 A2    5/1988
(Continued)

OTHER PUBLICATIONS

Machine translation of EP 0268155 A, no date.*
(Continued)

*Primary Examiner* — Joseph L. Perrin
(74) *Attorney, Agent, or Firm* — RatnerPrestia

(57) ABSTRACT

A method for operating a washing machine (10) having a washing tub (24) containing a laundry drum (26). The method has the steps of:
  detecting a liquid level (44) in the washing tub (24) and/or in a draining region thereof while the laundry drum (26) is rotating at a first speed,
  comparing the detected liquid level (44) with an upper threshold value (48), wherein the excess of said upper threshold value (48) by the liquid level (44) while the laundry drum (26) rotates at a rotation speed equal or higher than the first speed generates a closed liquid ring at circumferential walls of the laundry drum (26), and
  if the detected liquid level (44) exceeds the upper threshold value (48), then reducing the rotational speed of the laundry drum (26) below the first speed and performing a foam-detecting procedure for detecting the amount and/or presence of foam inside the washing tub (24) and/or in the draining region thereof.

20 Claims, 6 Drawing Sheets

(51) Int. Cl.
  *D06F 33/02* (2006.01)
  *D06F 39/08* (2006.01)
  *G05B 19/042* (2006.01)

(52) U.S. Cl.
  CPC ...... *D06F 39/087* (2013.01); *D06F 2202/085* (2013.01); *D06F 2204/065* (2013.01); *D06F 2204/084* (2013.01); *D06F 2212/02* (2013.01); *G05B 19/042* (2013.01); *G05B 2219/2633* (2013.01)

(56) References Cited

U.S. PATENT DOCUMENTS

| | | |
|---|---|---|
| 6,269,666 B1 | 8/2001 | Whah et al. |
| 2005/0197264 A1 | 9/2005 | Czyzewski et al. |
| 2007/0107138 A1 | 5/2007 | Bernardino et al. |
| 2008/0155760 A1 | 7/2008 | Hoppe |
| 2010/0192310 A1 | 8/2010 | Moschutz |
| 2010/0199440 A1 | 8/2010 | Hasse et al. |
| 2012/0145196 A1 | 6/2012 | Hardaway |
| 2012/0198633 A1 | 8/2012 | Jang et al. |
| 2014/0041728 A1 | 2/2014 | Borges et al. |

FOREIGN PATENT DOCUMENTS

| | | |
|---|---|---|
| EP | 2034078 A1 | 3/2009 |
| WO | 2007074037 A1 | 7/2007 |

OTHER PUBLICATIONS

International Search Report dated Nov. 5, 2014 in corresponding International Application No. PCT/EP2014/068995.

International Search Report dated Nov. 3, 2014 in related International Application No. PCT/EP2014/068994.

International Search Report dated Oct. 10, 2014 in related International Application No. PCT/EP2014/066494.

Non-Final Office Action issued in related U.S. Appl. No. 14/916,715, dated Jan. 9, 2017.

\* cited by examiner

METHOD FOR OPERATING A WASHING MACHINE

FIELD

The present invention relates to a method for operating a washing machine. Further, the present invention relates to a corresponding washing machine.

BACKGROUND

Known washing machines comprise a casing containing a washing tub in which there is a rotatable laundry drum in which the laundry to be washed can be loaded. A hydraulic circuit is provided for taking washing liquid, i.e. water and water mixed with a cleaning product, inside the washing tub and the laundry drum, so as to wash or rinse the laundry, and for draining, e.g. by using a drain pump, this liquid outside the machine. In other known washing machines drain pump is not provided and the washing liquid is drained from the tub by gravity.

During a washing cycle in a washing machine one or more dewatering phases, balancing phases, spinning phases and rinsing phases are performed. When the washing liquid is moved, for example by rotating the laundry drum, in particular when such liquid contains a detergent, a certain amount of foam is typically generated. If too much foam is generated in the washing tub or in the draining region thereof, then some phases of the washing cycle cannot be faultlessly performed.

In particular an high amount of foam can be very negative during the spinning and draining phase of the washing cycle (in which the laundry drum is rotated at high speed and the liquid present in the washing tub is drained from the machine), since the foam compromises a correct functioning of the drain pump (if provided) and it obstructs the draining of the liquid from the machine.

Some known methods for operating a washing machine are known, in which the amount of foam in the washing tub is monitored, in particular during the spinning phase, in order to start a foam reducing procedure if this amount is too high. In these known methods, the monitoring of the foam amount is performed by detecting the liquid level in the washing tub or in the draining region.

A problem which arises in the monitoring of the foam amount is that this monitoring can't be effectively performed if a closed liquid ring (called also water ring) is formed at circumferential walls of the laundry drum; when the drum is rotating at a certain rotation speed there is a threshold level of the liquid level in the washing tub at which the liquid starts rotating along the circumferential walls of the drum, in such a way to create a closed liquid ring. This liquid ring can't be easily drained by the drain circuit, since it tends to keep rotating along the circumferential walls of the drum. In this condition the liquid level in the tub or in the draining region can't be accurately measured, and since the foam monitoring is typically related to measuring the liquid level, also the foam amount can't be correctly measured. If a closed liquid ring is formed, the monitoring of the foam amount, and therefore any related foam reducing procedure, can't be correctly performed. Since the threshold level is smaller for higher rotation speeds, this problem is particularly present during the spinning phases of the washing cycle, when the rotation speed is higher.

In particular during the dewatering phase and/or the spinning phase of the washing cycle, the formation of a closed liquid ring at circumferential walls of the laundry drum should be therefore avoided, since it affects negatively the monitoring of the liquid level, and also the monitoring of the foam amount.

SUMMARY OF SELECTED INVENTIVE ASPECTS

It is an object of aspects of the present invention to provide an improved method for operating a washing machine which allows effectively performing a foam detecting procedure, in particular during a spinning phase of the washing cycle.

According to aspects of the present invention the method for operating a washing machine comprising a washing tub containing a laundry drum, wherein said method comprises the steps of:
  detecting a liquid level in said washing tub and/or in a draining region thereof while said laundry drum is rotating at a first speed,
  comparing the detected liquid level with an upper threshold value, wherein the excess of said upper threshold value by the liquid level while the laundry drum rotates at a rotation speed equal or higher than said first speed generates a closed liquid ring at circumferential walls of the laundry drum, and
  if the detected liquid level exceeds the upper threshold value, then reducing the rotational speed of the laundry drum below said first speed and performing a foam-detecting procedure for detecting the amount and/or presence of foam inside the washing tub and/or in the draining region thereof.

Aspect of the present invention define, for each first rotation speed at which the laundry drum is rotating, an upper threshold value for the liquid level which, at that first rotation speed, causes the formation of a closed liquid ring at the circumferential walls of the laundry drum, and the reduction of the rotational speed of the laundry drum if said upper threshold value is exceeded by the detected liquid level, so as to avoid the formation of said closed liquid ring; in this way it is ensured that the foam-detecting procedure is performed in absence of a closed liquid ring, which could affect its accuracy.

Advantageously, the foam-reducing procedure is started if said foam-detecting procedure detects presence of foam inside the washing tub and/or in the draining region thereof and/or detects that the amount of foam inside the washing tub and/or in the draining region thereof exceeds a predetermined threshold.

Preferably, the method is performed during a dewatering phase and/or a spinning phase of the washing cycle.

Additionally, a drain pump of the washing machine may be switched off for a predetermined time if the detected liquid level exceeds the upper threshold value.

Advantageously, the predetermined time for switching off the drain pump is between one second and three seconds, preferably two seconds.

For example, said foam-reducing procedure advantageously comprises the following steps:
  starting a predetermined monitoring period,
  detecting the liquid level in the washing tub and/or in the draining region thereof during said predetermined monitoring period,
  comparing the detected liquid level with a lower threshold value during the predetermined monitoring period, and if the detected liquid level does not decrease or drop below the lower threshold value within the predetermined monitoring period, then starting a foam-reducing procedure.

For example, the predetermined monitoring period may advantageously be between five seconds and twenty seconds, preferably ten seconds.

According to an alternative method said foam-reducing procedure advantageously comprises the following steps:
  detecting and storing a value related to the liquid level in the washing tub and/or in the
  draining region thereof during the drain pump is activated and the laundry drum is rotating,
  smoothing a signal of the stored value related to liquid level,
  determining gradient of the smoothed signal,
  starting a foam-reducing procedure if the determined gradient corresponds to a prefixed value or is switch a prefixed range of values.

During optional further steps the drain pump may be advantageously switched on within the predetermined monitoring period and, if said foam-reducing procedure is started, then the drain pump remains activated, and, if said foam-reducing procedure is not started, then the drain pump is switched off for a predetermined period and then switched on again.

For example, said predetermined period for switching off the drain pump may advantageously be between 20 seconds and 40 seconds, preferably 30 seconds.

Further, said foam-reducing procedure may advantageously comprise reducing the rotational speed of the laundry drum or stopping the latter, and switching off the drain pump for a predetermined period and then switching it on again.

For example, said predetermined period for switching off the drain pump is between a half minute and two minutes, preferably one minute.

According to a special embodiment of the present invention, said foam-reducing procedure may advantageously comprise, after reducing the rotational speed of the laundry drum or stopping the latter and switching of the drain pump for a predetermined period and then switching it on again, the steps of:
  detecting again the liquid level in the washing tub and/or in the draining region thereof, and,
  if the detected liquid level does still not decrease or drop below the lower threshold value within the predetermined period, adding water into in the washing tub, and draining the washing tub and starting a balancing phase.

Moreover, aspects of the present invention relate to a washing machine, wherein the washing machine is provided for the method mentioned above.

At last, aspects of the present invention relates to a computer program product stored on a computer usable medium, comprising computer readable program means for causing a computer to perform the method mentioned above.

BRIEF DESCRIPTION OF THE DRAWINGS

Aspects of the invention will be described in further detail with reference to the drawings, in which.

DETAILED DESCRIPTION OF EXAMPLE EMBODIMENTS

Figure 1:
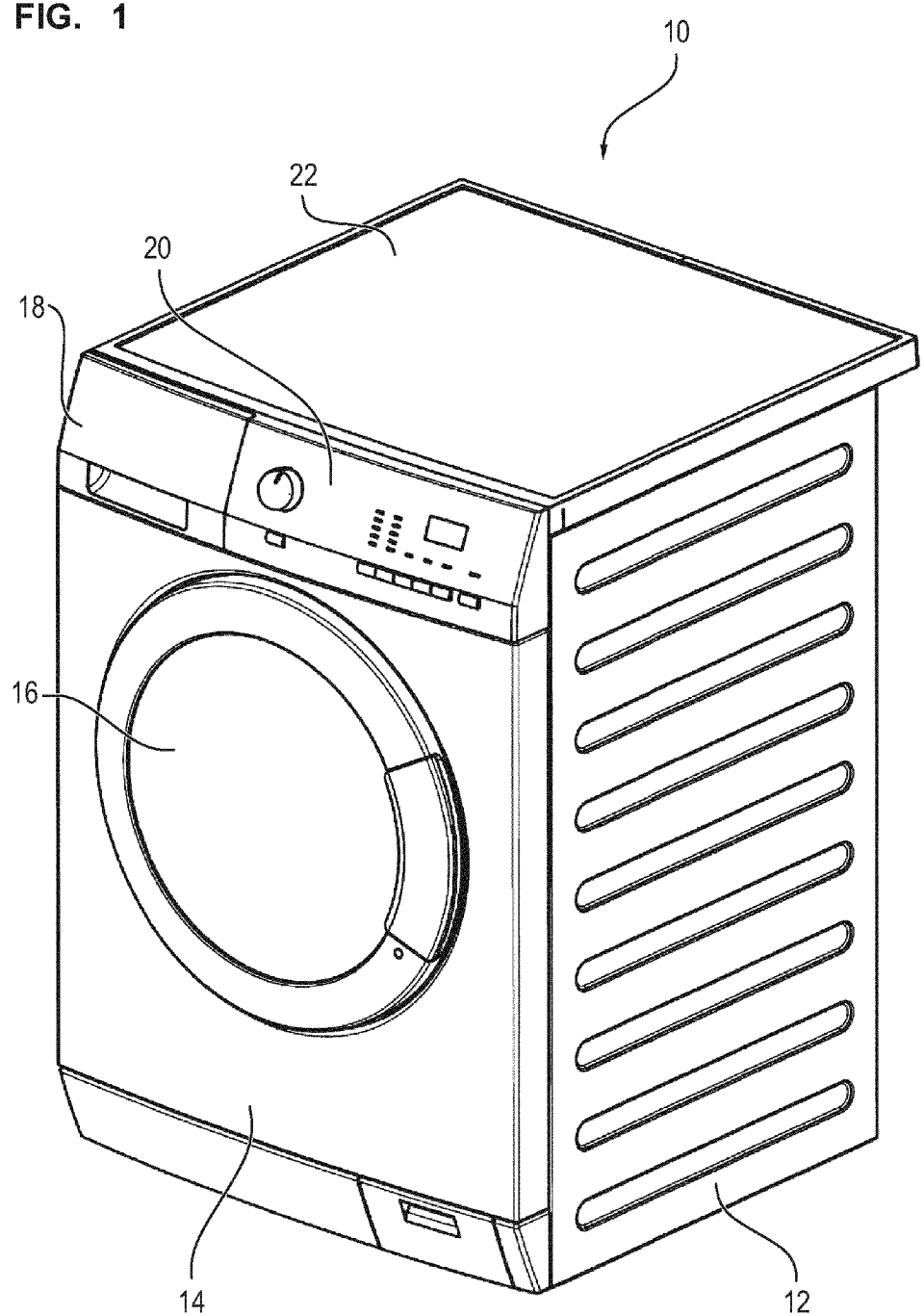
FIG. 1 illustrates a schematic perspective view of a washing machine according to a preferred embodiment of the present invention.

FIG. 1 illustrates a schematic perspective view of a washing machine 10 according to a preferred embodiment of the present invention.

The washing machine 10 comprises a casing 12. A front panel 14 is preferably attached at the front side of the casing 12. A front door 16 is advantageously arranged in the centre of the front panel 14. A detergent drawer 18 and a control panel 20 are advantageously arranged at the front side of the casing 12 and above the front panel 14. A top cover 22 is advantageously arranged on the top side of the casing 12.

Even if the present invention has been illustrated with reference to a front loading washing machine, it is clear that the present invention is not limited to a front loading washing machine, but it also relates to a top loading washing machine.

Figure 2:
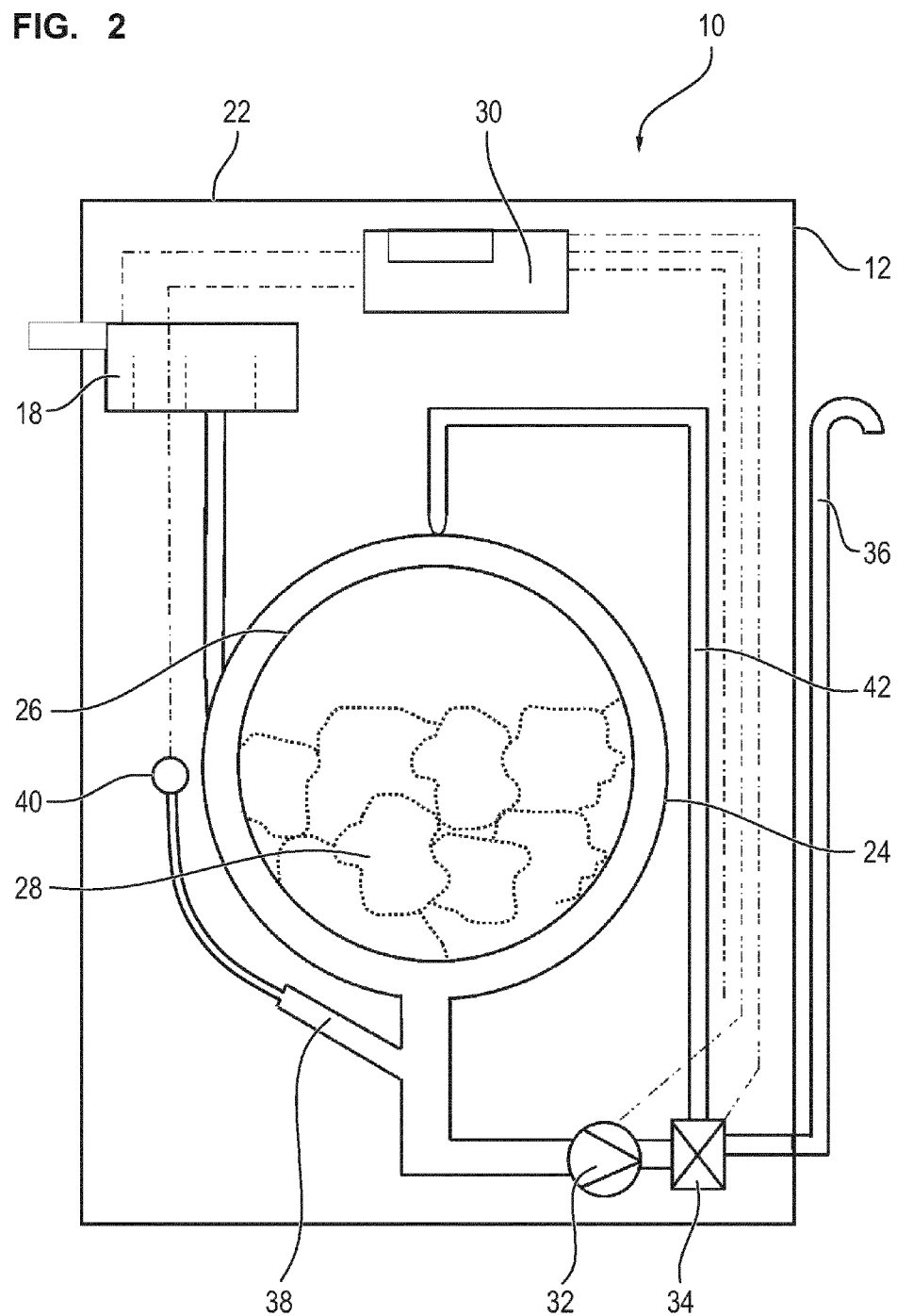
FIG. 2 illustrates a schematic sectional front view of the washing machine according to the preferred embodiment of the present invention.

FIG. 2 illustrates a schematic sectional front view of the washing machine 10 according to the preferred embodiment of the present invention. FIG. 2 shows components of the washing machine 10 inside the casing 12.

The washing machine 10 advantageously comprises the casing 12 and preferably the top cover 22 arranged upon said casing 12. A washing tub 24 is arranged advantageously in a central portion inside the casing 12. A rotatable laundry drum 26 is arranged inside the washing tub 24. The laundry drum 26 and the washing tub 24 are advantageously arranged behind the front door 16. A control unit 30 is advantageously provided, preferably arranged in an upper portion of the casing 12 of the washing machine 10. The detergent drawer 18 is advantageously arranged above the washing tub 24. A drain pump 32 and preferably also a three-way valve 34 are provided, preferably arranged in a lower portion of the casing 12 of the washing machine 10. A drain duct 36 is arranged partially inside and outside the casing 12 of the washing machine 10. Further, the washing machine 10 advantageously comprises an air trap 38, a pressure sensor 40 and, preferably, a circulation duct 42.

The control unit 30 is advantageously an electronic circuit. The control unit 30 is preferably electrically connected to the detergent drawer 18, and/or to the drain pump 32, and/or to the three-way valve 34 and/or to the pressure sensor 40. The detergent drawer 18 is advantageously mechanically connected to the washing tub 24 via a pipe. A bottom of the washing tub 24 is advantageously connected to an inlet of the drain pump 32. An outlet of the drain pump 32 is advantageously connected to the three-way valve 34.

Further, the three-way valve 34 is advantageously directly connected to the drain duct 36 and to the circulation duct 42. The circulation duct 42 advantageously interconnects the three-way valve 34 and a top side of the washing tub 24. The fluid delivered by the drain pump 32 is preferably casted away via the drain duct 36 and/or recirculated into the washing tub 24 via the circulation duct 42, if said duct is really provided. A lower end of the air trap 38 is advantageously connected to the bottom side of the washing tub 24. A higher end of the air trap 38 is advantageously connected to the pressure sensor 40.

The three-way valve 34 and the circulation duct 42 are optional, so that the recirculation is also optional. Instead of the one drain pump 32 the washing machine 10 may comprise two drain pumps, wherein the one drain pump is provided for casting away the fluid from the washing tub 24, while the other drain pump is provided for the recirculation. Further, a filter element may be advantageously arranged downstream of the drain pump 32.

The pressure sensor 40 is provided for detecting the liquid level in the washing tub 24 or in a draining region thereof. Instead of the pressure sensor 40, other suitable sensors may be provided for detecting the liquid level in the washing tub 24 or in the draining region thereof. There are several applications of the pressure sensor 40 as explained below.

An important application of the pressure sensor 40 is the determination of the presence and/or amount of foam in the washing tub 24 and/or the draining region thereof. During the drain pump 32 is running and the laundry drum 26 is rotating, it is detected by the pressure sensor 40, if the liquid level 44 in the washing tub 24 or in a draining region thereof is dropped below a predetermined threshold value within a certain time period. Preferably, this is performed during the spinning phase of the washing cycle. Preferably, it is determined the presence and/or a high amount of foam in the washing tub 24 tub and/or in the draining region thereof if a signal from the pressure sensor 40 has decreased or dropped below a threshold value during a predetermined monitoring period 54. For example, said monitoring period 54 may be about ten seconds. If the liquid level 44 has decreased or dropped below a lower threshold value 46 within the monitoring period 54, then presence of only water or a low amount of foam is detected. If the liquid level 44 has not decreased or dropped below the lower threshold value 46, then presence of foam or a high amount of foam is detected.

Another application of the pressure sensor 40 may be advantageously performed during the rotation of the laundry drum 26, preferably during a dewatering or spinning phase.

If, when the drum is rotating at a certain first speed, named for example first speed v1, the liquid level in the washing tub 24 or in the draining region thereof would reach a corresponding upper threshold value 48, then a closed liquid ring would be formed along the circumferential wall of the laundry drum 26, which impedes the draining of the liquid.

When the drum is rotating at a certain first speed v1, if the control unit 30 detects that the liquid level in the washing tub 24 or in the draining region thereof has reached a corresponding upper threshold value 48, it advantageously reduces the rotational speed of the laundry drum 26, so that the closed liquid ring is not formed and the draining of the liquid is not impeded.

Then control unit 30 advantageously detects, as mentioned above, the presence and/or the amount of foam in the washing tub 24 or the draining region thereof, and, if an high amount of foam is detected, it advantageously starts a foam-reducing procedure.

Further, the drain pump 32 may be advantageously switched off for a short time, e.g. about two seconds, after reaching the upper threshold value during a monitoring time period. This allows avoiding the formation of the closed liquid ring, and that air may exit the drain pump 32.

According to the present invention, the application of the pressure sensor 40 is performed during the rotation of the laundry drum 26, preferably during a dewatering or spinning phase of the washing cycle. The laundry drum 26 rotates at a first speed v1. The detected liquid level 44 is compared with the upper threshold value 48. The excess of said upper threshold value 48 by the liquid level 44 while the laundry drum 26 rotates at a rotation speed equal or higher than said first speed v1 generates a closed liquid ring at circumferential walls of the laundry drum 26. If the detected liquid level 44 exceeds the upper threshold value 48, then the rotational speed of the laundry drum 26 is reduced below said first speed v1. Additionally, the predetermined monitoring period 54 is started. The liquid level 44 in the washing tub 24 and/or in the draining region thereof is detected during the predetermined monitoring period 54. The detected liquid level 44 is compared with a lower threshold value 46 during the predetermined monitoring period 54. If the detected liquid level 44 does not decrease or drop below the lower threshold value 46 within said predetermined monitoring period 54, then the foam-reducing procedure is started. Preferably, the drain pump 32 is switched off for a predetermined time, if the detected liquid level 44 exceeds the upper threshold value 48. For example, the predetermined time for switching off the drain pump 32 is between one second and three seconds, preferably two seconds.

A further advantageous application of the pressure sensor 40 is the detection of the foam as mentioned above, when the laundry drum 26 is rotating at a rotational speed, at which the laundry 28 sticks, clings or remains attached to the circumferential wall of the laundry drum 26. This avoids a complete repetition of the balancing phase before the spinning phase. During the balancing phase the laundry 28 is distributed at the circumferential wall of the laundry drum 26. For attaching the laundry 28 to the circumferential wall of the laundry drum 26 with a standard diameter, a rotational speed of at least 80 rpm to 100 rpm is advantageously required. The rotational speed of the laundry drum 26 is controlled in such a way that the laundry 28 is kept attached to the circumferential wall of the laundry drum 26.

An additional application of the pressure sensor 40 may be performed after the detection of the foam as mentioned above. The drain pump 32 may be advantageously switched on again during a monitoring period. If a high amount of foam is detected, i.e. the liquid level in the washing tub 24 or in the draining region thereof exceeds the upper threshold value, the drain pump 32 is advantageously switched off again for a period, for example about 30 s, in order to settle the foam for draining. Then, then the drain pump 32 is switched on again. If the liquid level in the washing tub 24 or in the draining region thereof is below the upper threshold value, then absence of foam or a low amount of foam is detected.

If an high amount of foam is detected at the end of the monitoring period by a liquid level which is higher than the upper threshold value 48, then the rotational speed of the laundry drum 26 is preferably reduced to a low value or the laundry drum 26 is stopped and the drain pump 32 is switched off for a certain period, e.g. for one minute, in order to allow the foam to settle. Then the drain pump 32 is preferably switched on again and the liquid level is detected again. If the liquid level still does not drop below the second threshold value after the monitoring period, then preferably water is added and the washing tub 24 is drained and a balancing phase before the spinning phase is started. However, if the liquid level is lower than the threshold value, then the spinning phase is preferably commenced again, more preferably after another balancing phase.

Figure 3:
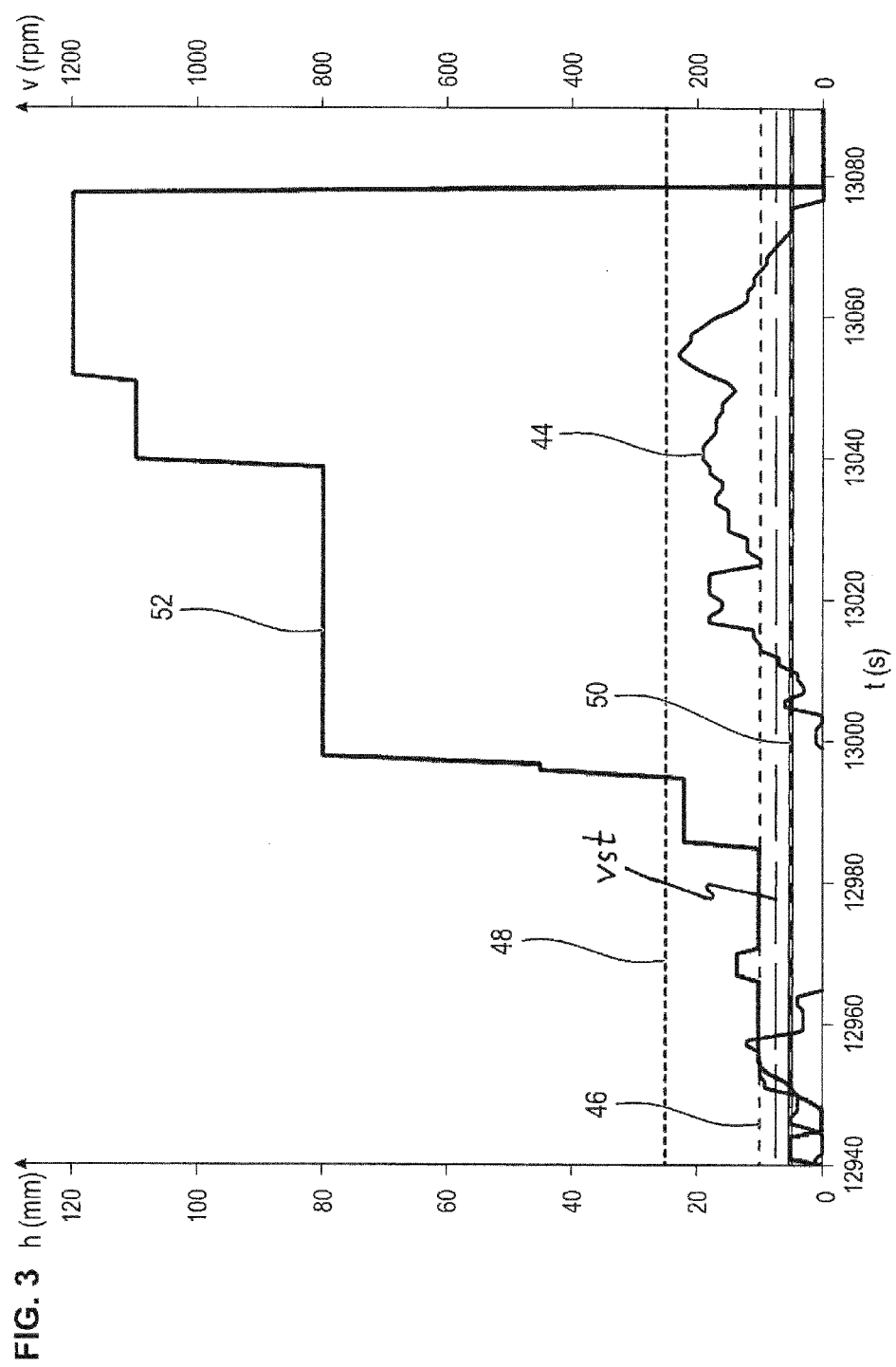
FIG. 3 illustrates a schematic set of diagrams as functions of the time during a time slot of a washing cycle in a first situation according to the preferred embodiment of the present invention.

FIG. 3 illustrates a schematic set of diagrams as functions of the time during a time slot of the washing cycle in a first situation according to the preferred embodiment of the present invention.

The time slot between t=12940 s and t=13090 s of the washing cycle is shown in FIG. 3. Within said time slot the balancing phase and the spinning phase are performed. A washing phase has been performed before said time slot. During the balancing phase the rotational speed v of the laundry drum 26 increases. In the beginning of the balancing phase the laundry 28 is not attached at the circumferential wall of the laundry drum 26. However, in the end of the balancing phase the laundry 28 is attached at the circumferential wall of the laundry drum 26. In FIG. 3 the spinning phase is started at about t=12985 s.

A liquid level 44 in the washing tub 24 varies between 0 mm and about 22 mm within the time slot. A lower threshold value 46 of the liquid level is defined at 10 mm. An upper threshold value 48 of the liquid level is defined at 25 mm. The liquid level 44 in the washing tub 24 is always below the upper threshold value 48. A state 50 of the drain pump 32 is always activated during the time slot. During the spinning phase a rotational speed 52 of the laundry drum 26 reaches about 800 rpm and then about 1200 rpm. In FIG. 3 the sticking speed vst is 80 rpm. In general, the sticking speed vst may be between 80 rpm and 100 rpm.

Figure 4:
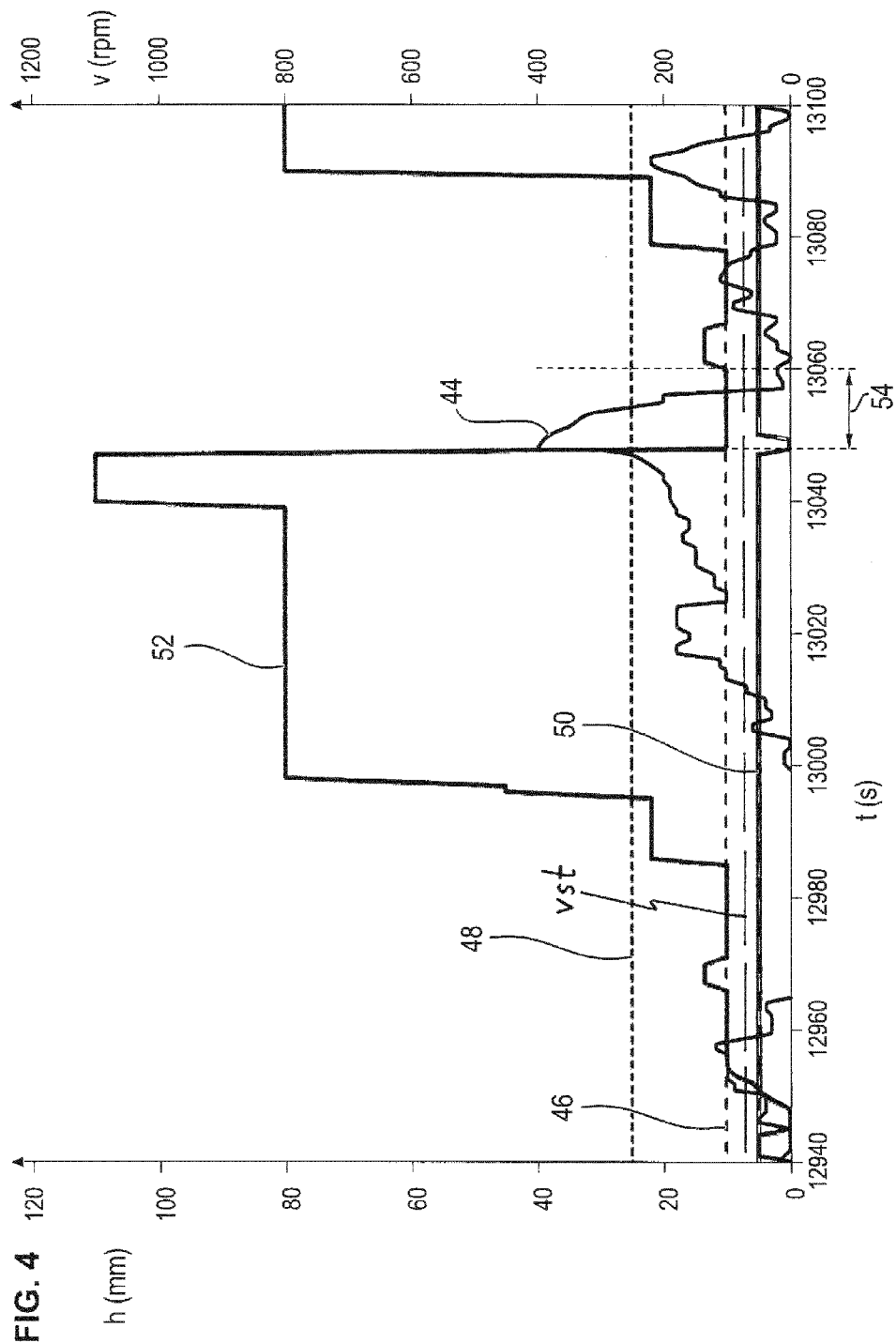
FIG. 4 illustrates a schematic set of diagrams as functions of the time during the time slot of the washing cycle in a second situation according to the preferred embodiment of the present invention.

FIG. 4 illustrates a schematic set of diagrams as functions of the time during the time slot of the washing cycle in a second situation according to the preferred embodiment of the present invention. Also FIG. 4 shows the time slot between t=12940 s and t=13090 s of the washing cycle, in which time slot the balancing phase and the spinning phase occurs. In FIG. 4 the spinning phase is started also at t=12985 s.

The liquid level 44 in the washing tub 24 varies between 0 mm and about 40 mm within the time slot. The lower threshold value 46 of the liquid level is defined at 10 mm, while the upper threshold value 48 of the liquid level is defined at 25 mm. Between about t=13048 s and t=13055 s the liquid level 44 in the washing tub 24 exceeds the upper threshold value 48. This is the only excess of the liquid level 44 within the time slot. During the remaining times of the time slot the liquid level 44 in the washing tub 24 is below the upper threshold value 48. The state 50 of the drain pump 32 is deactivated between about t=13048 s to t=13052 s, after the liquid level 44 in the washing tub 24 has exceeded the upper threshold value 48. During the remaining times of the time slot the state 50 of the drain pump 32 is activated. The spinning phase is stopped at t=13048 s, since the liquid level 44 in the washing tub 24 has exceeded the upper threshold value 48. The spinning phase remains interrupted during a timeout 54 of about ten seconds. During this timeout 54 the rotational speed 52 of the laundry drum 26 is reduced to v=100 rpm. The liquid level 44 in the washing tub 24 goes below the lower threshold value 46 during the timeout 54. The spinning phase is restarted at t=13060 s, after the liquid level 44 in the washing tub 24 has been detected. In FIG. 4 the sticking speed vst is also 80 rpm.

Figure 5:
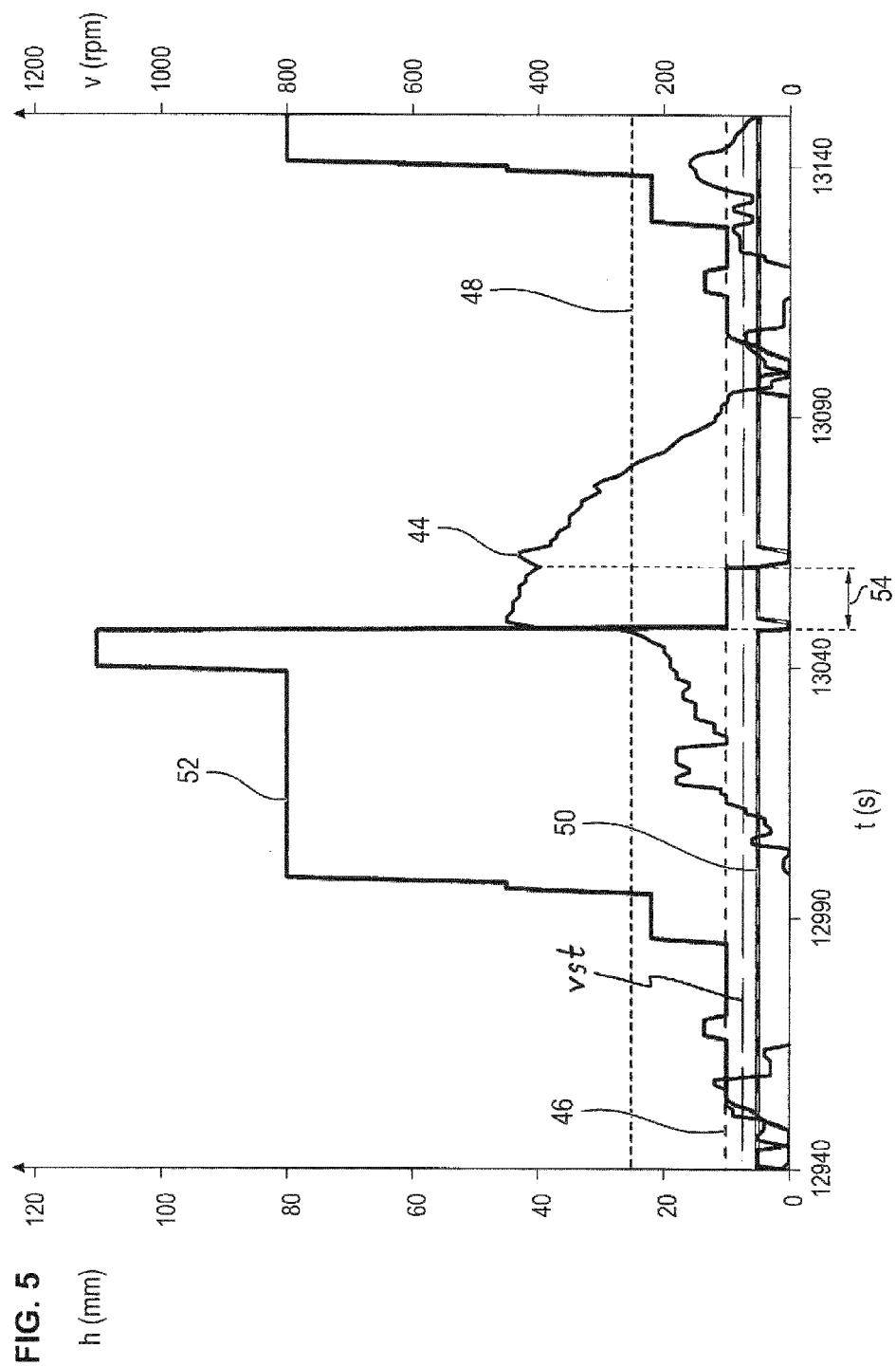
FIG. 5 illustrates a schematic set of diagrams as functions of the time during the time slot of the washing cycle in a third situation according to the preferred embodiment of the present invention.

FIG. 5 illustrates a schematic set of diagrams as functions of the time during the time slot of the washing cycle in a third situation according to the preferred embodiment of the present invention. FIG. 5 shows also the time slot between t=12940 s and t=13090 s of the washing cycle, in which time slot the balancing phase and the spinning phase occurs. In FIG. 5 the spinning phase is started at about t=12985 s.

The liquid level 44 in the washing tub 24 varies between 0 mm and about 53 mm within the time slot. The lower threshold value 46 of the liquid level is defined at 10 mm, while the upper threshold value 48 of the liquid level is defined at 25 mm. Between about t=13048 s and t=13080 s the liquid level 44 in the washing tub 24 exceeds the upper threshold value 48 within the time slot. During the remaining times of the time slot the liquid level 44 in the washing tub 24 is below said upper threshold value 48.

The state 50 of the drain pump 32 is deactivated between about t=13048 s to t=13050 s, after the liquid level 44 in the washing tub 24 has exceeded the upper threshold value 48. The spinning phase is stopped at t=13048 s, since the liquid level 44 in the washing tub 24 has exceeded the upper threshold value 48. After the timeout 54 the rotation of the laundry drum 26 is completely stopped and the state 50 of the drain pump 32 is deactivated again between about t=13058 s to t=13060 s, since the liquid level 44 in the washing tub 24 has not been decreased below the upper threshold value 48 and foam has been detected. The complete stop of the rotation of the laundry drum 26 at about t=13058 s and the deactivation of the drain pump 32 between about t=13058 s to t=13060 s causes a decreasing of the foam. After the liquid level 44 in the washing tub 24 goes below the lower threshold value 46 at about t=13095 s, the rotation of the laundry drum 26 is activated again. A further spinning phase is started at about t=13125 s. In FIG. 5 the sticking speed vst is also 80 rpm.

Figure 6:
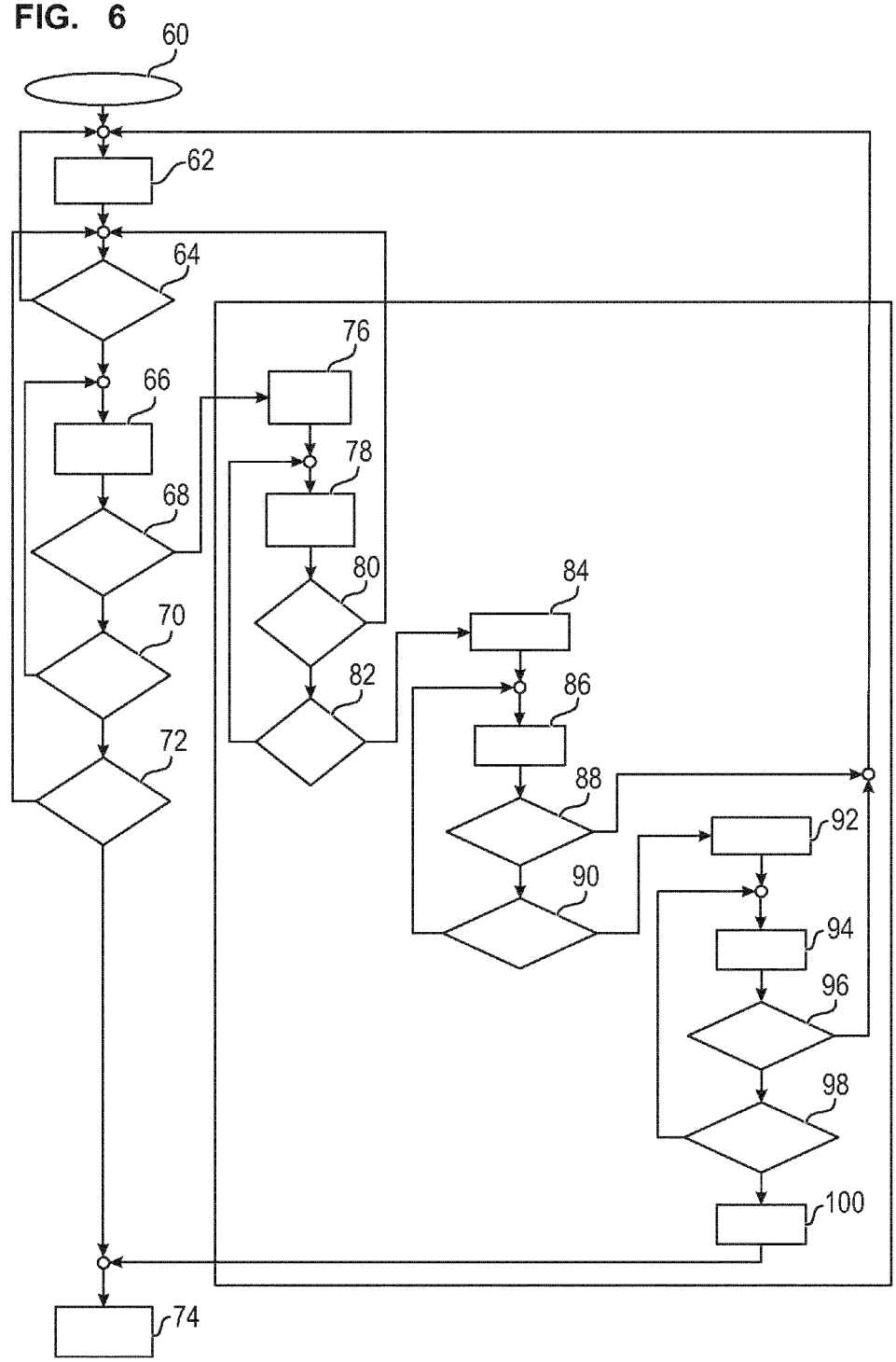
FIG. 6 illustrates a schematic flow chart diagram of a method for operating a washing machine according to a fourth embodiment of the present invention.

FIG. 6 illustrates a schematic flow chart diagram of a method for operating a washing machine according to a fourth embodiment of the present invention.

In a step 60 the method for operating the washing cycle is started. As a next step 62 a balancing phase is started, wherein the rotational speed of the laundry drum 26 is increased from a low speed to a high speed. During the rotation at said low speed the laundry 28 is not attached at the circumferential wall of the laundry drum 26, while the rotation at said high speed the laundry 28 is attached at the circumferential wall of the laundry drum 26.

In a further step 64 it is checked, if the unbalance satisfies safety conditions. If the safety conditions are not satisfied, then the step 62 is repeated. If the safety conditions are satisfied, then the rotational speed of the laundry drum is increased in a further step 66. In a subsequent step 68 the liquid level in the washing tub 24 and/or in the draining region thereof is detected and compared with a threshold value in order to determine if a high amount of foam occurs in the washing tub 24 and/or in the draining region thereof.

If a high amount of foam is detected, then the method is set forth in a step 76. If low amount of foam or no foam at all is detected, then in a next step 70 the speed profile of the laundry drum 26 is checked. If the speed profile of the laundry drum 26 is finished, then the finalisation of the spinning phase is checked in a step 72. If the speed profile of the laundry drum 26 is not yet finished, then the step 64 and the subsequent steps are repeated again. If in the step 72 the finalisation of the spinning phase is detected, then the washing cycle is continued in a step 74.

If in the step 68 the high amount of foam has been detected, then the rotational speed of the laundry drum 26 is decreased to a predetermined minimum value in the step 76. Then the drain pump 32 is running with a constant speed in a step 78.

In a next step 80 the liquid level 44 in the washing tub 24 is detected and compared with an upper threshold value 48. If the liquid level 44 is below the upper threshold value 48, then the step 64 and its subsequent steps are repeated again. If the liquid level 44 exceeds the upper threshold value 48, then the expiring of the timeout 54 is checked in a step 82. If the timeout 54 is not yet expired, then the steps 78 and 80 are repeated again. If the timeout 54 is expired, then the laundry drum 26 and the drain pump 32 are stopped in a step 84 for a predetermined time. In this example, said predetermined time is about 30 seconds. In a next step 86 the drain pump 32 is stopped.

As a next step 88 the liquid level 44 in the washing tub 24 is detected and compared with the upper threshold value 48 again. If the liquid level 44 is below the upper threshold value 48, then the step 62 and 64 are repeated again. If the liquid level 44 exceeds the upper threshold value 48, then the expiring of the timeout 54 is checked again in a step 90. If the timeout 54 is not yet expired, then the steps 86 and 88 are repeated again. If the timeout 54 is expired, then the laundry drum 26 and the drain pump 32 are stopped in a step 92.

In a next step 96 the liquid level 44 in the washing tub 24 is detected and compared with the upper threshold value 48 again. If the liquid level 44 is below the upper threshold value 48, then the step 62 and 64 are repeated again. If the liquid level 44 exceeds the upper threshold value 48, then the expiring of the timeout 54 is checked again in a step 98. If the timeout 54 is not yet expired in the step 98, then the steps 94 and 96 are repeated again. If the timeout 54 is expired in the step 98, then the drain pump 32 is stopped in a step 100 and then the washing cycle is continued in the step 74.

On point of the present invention is the definition of the upper threshold value by the liquid level, which avoids the formation of the closed liquid ring at the circumferential walls of the laundry drum. Another point of the present invention is the reduction of the rotational speed of the laundry drum, if said upper threshold value is exceeded by the detected liquid level, on the other hand. Then, it is detected whether there is really water or foam inside the washing tub and/or in the draining region thereof.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

The invention claimed is:

1. A method for operating a washing machine comprising a washing tub containing a laundry drum, said method comprises the steps of:
   detecting a liquid level in said washing tub and/or in a draining region thereof while said laundry drum is rotating at a first speed,
   comparing the detected liquid level with an upper threshold value, wherein the excess of said upper threshold value by the liquid level while the laundry drum rotates at a rotation speed equal or higher than said first speed generates a closed liquid ring at circumferential walls of the laundry drum, and
   initiating a foam-detecting procedure for detecting the amount and/or presence of foam inside the washing tub and/or in the draining region thereof only after said comparing, and if said comparing indicates that the detected liquid level exceeds the upper threshold value, then reducing the rotational speed of the laundry drum below said first speed prior to performing said foam-detecting procedure for detecting the amount and/or presence of foam inside the washing tub and/or in the draining region thereof.

2. The method according to claim 1, comprising starting the foam-reducing procedure if said foam-detecting procedure detects presence of foam inside the washing tub and/or in the draining region thereof and/or detects that the amount of foam inside the washing tub and/or in the draining region thereof exceeds a predetermined threshold.

3. The method according to claim 2, wherein said foam-detecting procedure comprises the following steps:
   detecting and storing a value related to the liquid level in the washing tub and/or in the draining region thereof while a drain pump of said washing machine is activated and the laundry drum is rotating,
   smoothing a signal of the stored value related to liquid level,
   determining gradient of the smoothed signal,
   starting a foam-reducing procedure if the determined gradient corresponds to a prefixed value or is switch a prefixed range of values.

4. The method according to claim 2, wherein a drain pump of said washing machine is switched on within the predetermined monitoring period and, if said foam-reducing procedure is started, then the drain pump remains activated, and, if said foam-reducing procedure is not started, then the drain pump is switched off for a predetermined period and then switched on again.

5. The method according to claim 4, wherein said predetermined period for the drain pump to be switched off is between 20 seconds and 40 seconds.

6. The method according to claim 2, wherein said foam-reducing procedure comprises reducing the rotational speed (v) of the laundry drum or stopping the latter, and switching off a drain pump of said washing machine for a predetermined period and then switching it on again.

7. The method according to claim 6, wherein the predetermined period for the drain pump to be switched off is between a half minute and two minutes.

8. The method according to claim 6, wherein said foam-reducing procedure comprises, after reducing the rotational speed (v) of the laundry drum or stopping the latter, and switching off the drain pump for a predetermined period and then switching it on again, the steps of:
   detecting again the liquid level in the washing tub and/or in the draining region thereof, and,
   if the detected liquid level does still not decrease below the lower threshold value within the predetermined period, adding water into in the washing tub, and draining the washing tub and starting a balancing phase.

9. The method according to claim 1, wherein the method is performed during a dewatering phase and/or a spinning phase of the washing cycle.

10. The method according to claim 1, wherein a drain pump of said washing machine is switched off for a predetermined time if the detected liquid level exceeds the upper threshold value.

11. The method according to claim 10, wherein the predetermined time for switching off the drain pump is between one second and three seconds.

12. The method according to claim 1, wherein said foam-detecting procedure comprises the following steps:
   starting a predetermined monitoring period,
   detecting the liquid level in the washing tub and/or in the draining region thereof during said predetermined monitoring period,
   comparing the detected liquid level with a lower threshold value during the predetermined monitoring period, and
   if the detected liquid level does not decrease or drop below the lower threshold value within the predetermined monitoring period, determining that foam is present and accordingly starting a foam-reducing procedure.

13. The method according to claim 12, wherein the predetermined monitoring period is between five seconds and twenty seconds.

14. A washing machine comprising:
   a washing tub containing a laundry drum; and
   a controller configured to:
      detect a liquid level in said washing tub and/or in a draining region thereof while said laundry drum is rotating at a first speed,
      compare the detected liquid level with an upper threshold value, wherein the excess of said upper threshold value by the liquid level while the laundry drum rotates at a rotation speed equal or higher than said first speed generates a closed liquid ring at circumferential walls of the laundry drum, and
      initiate a foam-detecting procedure for detecting the amount and/or presence of foam inside the washing tub and/or in the draining region thereof only after said comparison, and if said comparison indicates that the detected liquid level exceeds the upper threshold value, then reduce the rotational speed of the laundry drum below said first speed prior to performing said foam-detecting procedure for detecting the amount and/or presence of foam inside the washing tub and/or in the draining region thereof.

15. The washing machine according to claim 14, wherein the controller is further configured to start the foam-reducing procedure if said foam-detecting procedure detects presence of foam inside the washing tub and/or in the draining region thereof and/or detects that the amount of foam inside the washing tub and/or in the draining region thereof exceeds a predetermined threshold.

16. The washing machine according to claim 15,
   wherein the controller is further configured to execute said foam-detecting procedure by:
      detecting and storing a value related to the liquid level in the washing tub and/or in the draining region thereof while a drain pump of said washing machine is activated and the laundry drum is rotating,
      smoothing a signal of the stored value related to liquid level,
      determining gradient of the smoothed signal, and
      starting a foam-reducing procedure if the determined gradient corresponds to a prefixed value or is switch a prefixed range of values.

17. The washing machine according to claim 14,
   wherein the controller is further configured to initiate a foam-detecting procedure during a dewatering phase and/or a spinning phase of the washing cycle.

18. The washing machine according to claim 14, further comprising:
   a drain pump,
   wherein the controller is further configured to switch off the drain pump for a predetermined time if the detected liquid level exceeds the upper threshold value.

19. The washing machine according to claim 18,
   wherein the predetermined time is between one second and three seconds.

20. The washing machine according to claim 14,
   wherein the controller is further configured to execute the foam-detecting procedure by:
      starting a predetermined monitoring period,
      detecting the liquid level in the washing tub and/or in the draining region thereof during said predetermined monitoring period,
      comparing the detected liquid level with a lower threshold value during the predetermined monitoring period, and
      if the detected liquid level does not decrease or drop below the lower threshold value within the predetermined monitoring period, determining that foam is present and accordingly starting a foam-reducing procedure.

* * * * *